United States Patent

Mukohjima et al.

[11] Patent Number: 5,189,331
[45] Date of Patent: Feb. 23, 1993

[54] VIBRATION WAVE DRIVEN MOTOR

[75] Inventors: Hitoshi Mukohjima, Yokohama; Takayuki Hirano, Utsunomiya; Yoshihiro Seki, Utsunomiya; Mituru Miura, Utsunomiya, all of Japan

[73] Assignee: Canon Kabushiki Kaisha, Tokyo, Japan

[21] Appl. No.: 806,787

[22] Filed: Dec. 12, 1991

Related U.S. Application Data

[63] Continuation of Ser. No. 475,988, Jan. 30, 1990, abandoned.

[30] Foreign Application Priority Data

Jan. 31, 1989 [JP] Japan ............................. 1-23087
Jan. 31, 1989 [JP] Japan ............................. 1-23088

[51] Int. Cl.⁵ .................................. H01L 41/08
[52] U.S. Cl. ........................................ 310/323
[58] Field of Search .................... 310/323, 328; 354/195.1, 400; 350/255, 252, 429

[56] References Cited

U.S. PATENT DOCUMENTS

| 4,495,432 | 1/1985 | Katsuma et al. | 310/321 X |
| 4,672,256 | 6/1987 | Okuno et al. | 310/328 X |
| 4,692,651 | 9/1987 | Hiramatsu et al. | 310/328 X |
| 4,743,791 | 5/1988 | Kawai | 310/328 X |
| 4,763,148 | 8/1988 | Tsukimoto et al. | 310/328 X |
| 4,771,203 | 9/1988 | Mukohjima et al. | 310/323 |
| 4,793,689 | 12/1988 | Aoyagi et al. | 310/323 X |
| 4,893,047 | 1/1990 | Honda | 310/323 |

FOREIGN PATENT DOCUMENTS

| 62-236368 | 10/1987 | Japan | 310/323 |
| 62-247768 | 10/1987 | Japan | 310/323 |

Primary Examiner—Mark O. Budd
Attorney, Agent, or Firm—Fitzpatrick, Cella, Harper & Scinto

[57] ABSTRACT

The present invention provides a vibration wave driven motor or actuator in which a discontinuous coupling member is provided between a vibration member and a load to be driven by a movable element. The coupling member blocks undesirable travelling wave to decrease the noise and prevent the lowering of the output.

7 Claims, 8 Drawing Sheets

VIBRATION WAVE DRIVEN MOTOR

This application is a continuation of application Ser. No. 475,988, filed Jan. 30, 1990, now abandoned.

BACKGROUND OF THE INVENTION

1. Field of the Invention

The present invention relates to a vibration wave driven motor adoptable for video apparatus, printer, semiconductor device or the like. More specifically, the present invention is directed to vibration absorbing means in a travelling wave type of vibration wave driven motor.

2. Related Background Art

A vibration wave driven motor or actuator is known in the art in which a travelling vibration wave is generated on an elastic member and a movable member such as a rotor is moved by the vibration wave. This type of motor has advantages that it is small in size and that a high torque can be obtained even at a low speed. For these advantages, this type of motor has recently been employed in a single-lens reflex camera as a motor for driving the photographing lens system.

Figure 3:
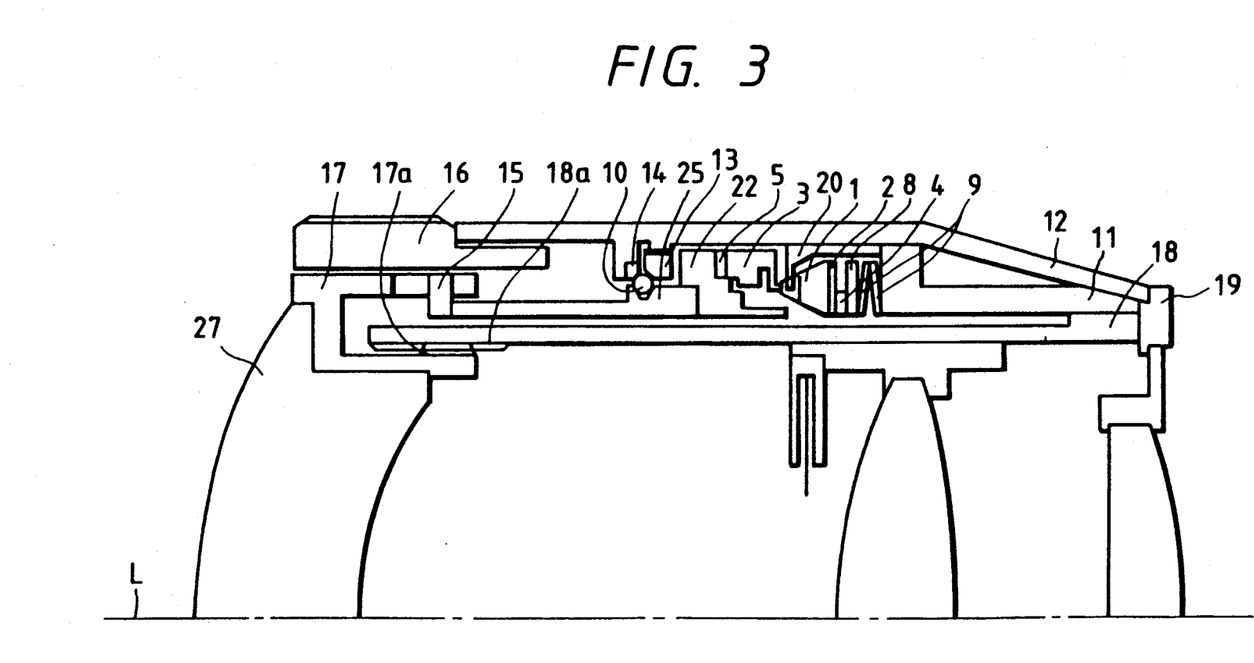
FIG. 3 is a longitudinal sectional view of the essential part of a photographing lens system of a single-lens reflex camera in which a vibration wave driven motor according to the prior art has been used.

FIG. 3 is a longitudinal sectional view of a prior art photographing lens system in a single-lens reflex camera having a vibration wave driven motor for driving the lens system.

Referring to the figure, the optical axis of the lens system is denoted by L. The reference numeral 1 denotes a metallic elastic member in a form of ring the rotational center of which corresponds with the optical axis L. The elastic member 1 has a piezo-electric element 2 fixed to the lower portion of the member by means of adhesives. The piezo-electric element 2 serves as an electromechanical energy conversion element and may be formed of, for example, PZT. In a method known per se, ultrasonic driving signals having different phases are applied to the piezo-electric element 2. In response to the applied signal, the elastic member 1 vibrates and there is generated a travelling vibration wave which travels round along the circumference of the elastic member 1 constituting a vibration element. The reference numeral 3 denotes a ring rotor as a movable member. An end of the rotor 3 is pressure-contacted with the upper surface of the elastic member 1. At the other end, the rotor 3 has a first vibration absorber 5 which may be made of rubber or the like. The reference numeral- 4 denotes a vibration isolator formed of felt or the like. The vibration isolator 4 is pressed against the piezo-electric element 2 by two plate springs 9 through a felt base 8.

Figure 4:
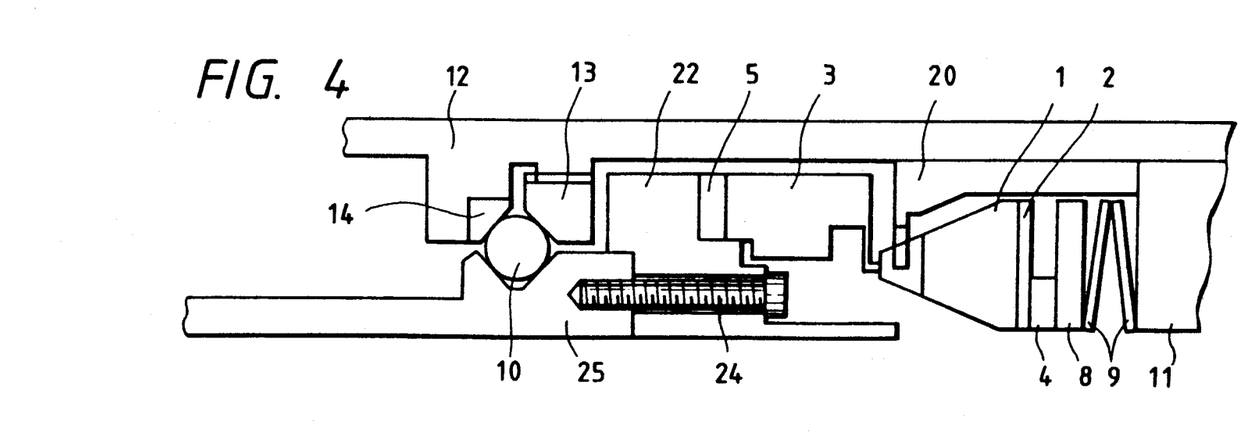
FIG. 4 is an enlarged view of the essential part of the prior art photographing lens system shown in FIG. 3.

FIG. 4 is an enlarged view of the essential part of the photographing lens system of the single-lens reflex camera shown in FIG. 3.

Figure 5:
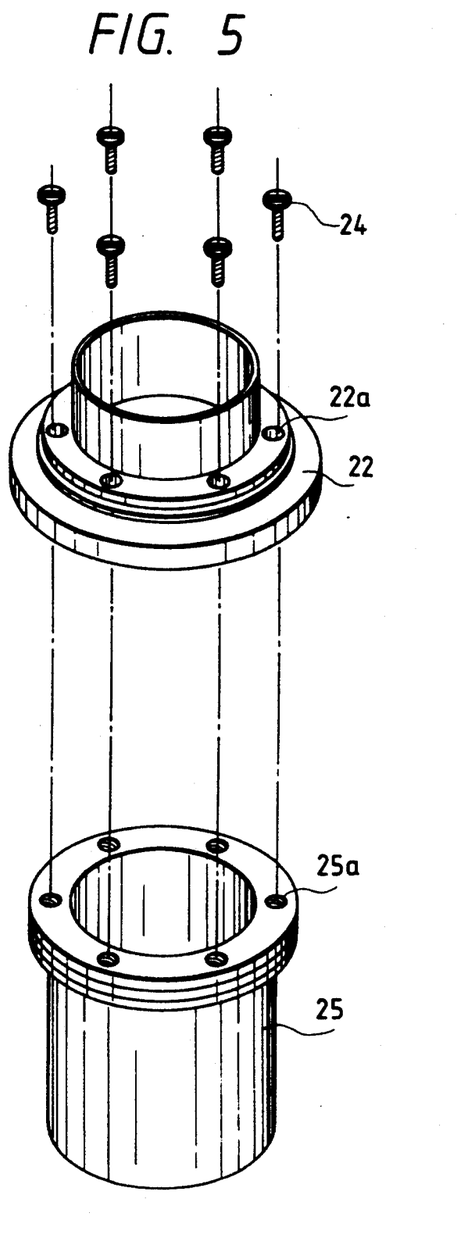
FIG. 5 is an exploded perspective view of the essential part of the prior art lens system shown in FIG. 3.

At the above-mentioned first vibration absorber 5, the rotor 3 is in close contact with a coupling ring plate 22. As seen best from an exploded perspective view of FIG. 5, the coupling ring plate 22 is fixedly coupled to an output transmission member 25 by six fastening screws 24 through clearance holds 22a and threaded holes 25a. The output transmission member 25 rotates about the optical axis L. The output transmission member 25, a ball 10 and ball 11 races 13, 14 together constitute a ball bearing. The ball races 13 and 14 are fixed to an outer tube 12 of the lens system. The outer tube 12 is coupled to a stationary tube 11 and they are fixed on a camera mount 19. At the forward end, the output transmission member 25 has a coupling roller 15 which is engaged in a key way (not shown) formed on a movable ring 17 in the direction along the optical axis. The movable ring 17 holds a focusing lens 27. The movable ring 17 has a thread portion 17a in helicoidal connection with a thread portion 18a of the stationary inner tube 18.

With the arrangement described above, when the output transmission member 25 is rotated, the movable ring 17 can be moved in the direction along the optical axis while rotating through the coupling roller 15 at the same time.

In this apparatus, therefore, the focusing lens 27 can be moved along the optical axis for focusing by rotating the rotor 3 by a travelling wave generated on the vibration member in response to an AF signal from the camera side or a driving signal from a manual ring 16.

The prior art apparatus as described above has, however, some drawbacks caused by the propagation of undesirable vibration wave. The coupling ring plate 22 in the prior art structure is not a perfect rigid body and, therefore, it is impossible to completely attenuate unnecessary and undesirable vibration of the rotor 3 by the first vibration absorber 5. Rather, such unnecessary vibration is transmitted to the coupling plate 22 and also to the output transmission member 25. The transmitted unnecessary vibration is reflected by the end of the output transmission member. The reflected vibration goes back to the rotor 3 through the coupling plate 22 and the first vibration absorber 5. This unnecessary vibration has an adverse effect on the contact between the rotor and the vibration element. As a result, there is generated noise. Further, the lowering of output is often caused by it.

SUMMARY OF THE INVENTION

Accordingly, an object of the present invention is to solve the above problems involved in the prior art apparatus and to provide an improved vibration wave driven motor in which the generation of noise as well as the lowering of output are minimized.

Another object of the present invention is to provide a vibration wave driven actuator for camera which is free of the above-mentioned drawbacks.

Other and further objects, features and advantages of the invention will appear more fully from the following description.

DESCRIPTION OF THE PREFERRED EMBODIMENTS

Figure 1:
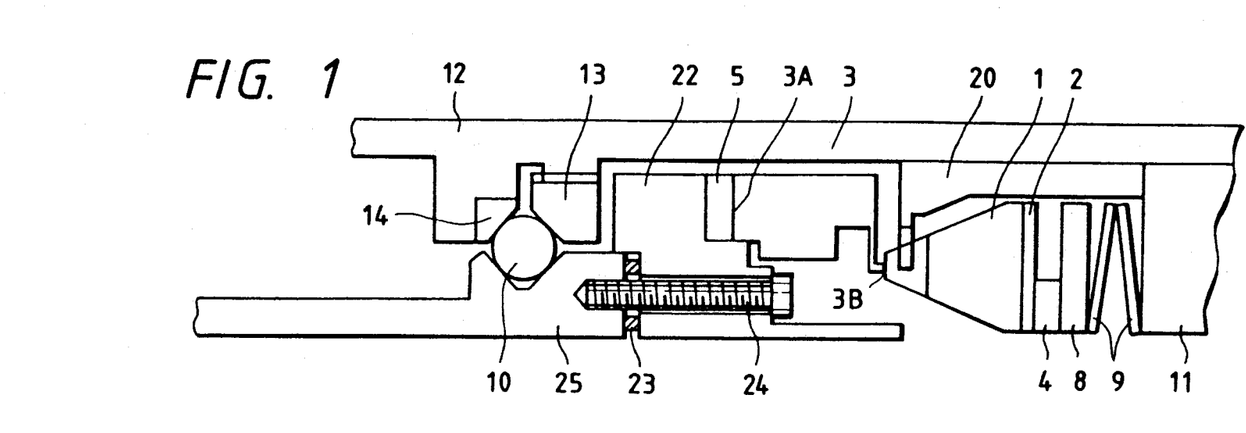
FIG. 1 is a longitudinal sectional view of the essential part of a photographing lens system of a single-lens reflex camera in which a vibration wave driven motor according to the present invention has been used.

FIG. 1 is an enlarged view of the essential part of a photographing lens system showing a first embodiment of the present invention. For the sake of easy understanding, the same reference numerals as in FIG. 3 are used also in FIG. 1 to denote functionally the same and corresponding members and no further description thereof will be made hereinunder.

Figure 2:
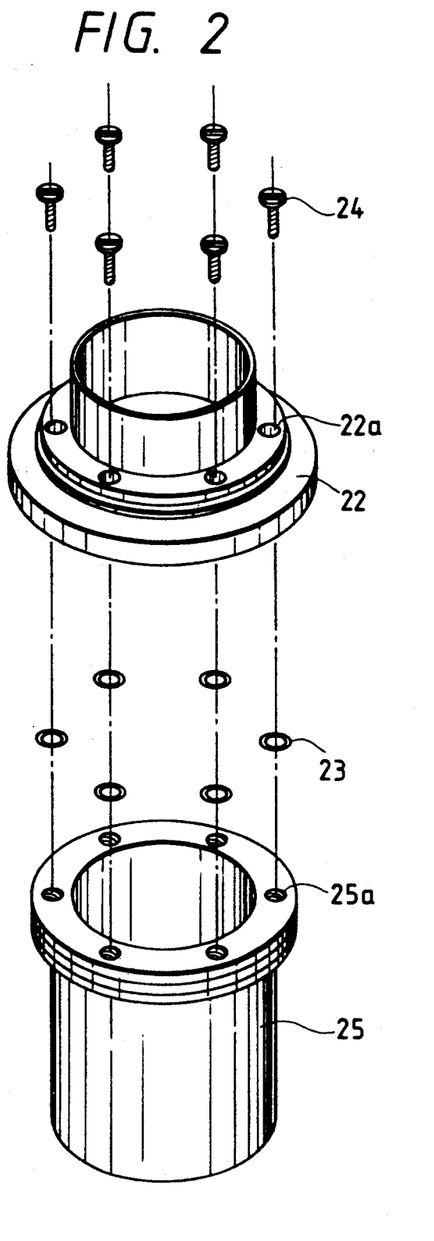
FIG. 2 is an exploded perspective view of the essential part of the photographing lens system in FIG. 1.

In the first embodiment, as seen best in FIG. 2, the coupling ring plate 22 and the output transmission member 25 are coupled each other not directly but with washers 23 being inserted between them. The coupling ring plate 22 and the output transmission member 25 with the washers 23 therebetween are fastened together by screws 24 through clearance holes 22a and threaded holes 25a. Consequently, the coupling ring plate 22 and the output transmission member 25 are coupled not continuously but discontinuously because of the presence of discrete washers 23.

As previously mentioned, the elastic member 1 and the piezo-electric element 2 constitute a vibration element. When two electric signals having different phases are applied to the piezo-electric element 2 from a driving signal source (not shown), the vibration element generates a travelling vibration wave in the manner known per se. As a result, the rotor 3 pressure-engaged with the elastic member 1 is rotated by it.

As the same time, there are generated some unnecessary vibration. However, the component of the unnecessary vibration which can be left remained is only a travelling wave component corresponding to the relative movement between the vibration element and the rotor 3. The standing wave component of the unnecessary vibration is damped by the relative movement. Thus, there remains only a traveling wave as the unnecessary vibration.

The unnecessary vibration which has not completely been damped by the vibration absorber 5 is transmitted to the coupling plate 22. However, since the coupling between the coupling plate 22 and the output transmission element 25 is discontinuous as the result of the washers 23 inserted therebetween, a large portion of the unnecessary vibration can not be transmitted further to the output transmission member 25. More specifically, such portion of the unnecessary vibration can not be transmitted further which is transmitted in the direction orthogonal or substantially orthogonal to the travelling component of the vibration by which the rotor 3 is rotated. Thus, only a standing wave component of the unnecessary vibration can reach the output transmission member 25. This standing vibration wave component is, however, finally attenuated by the relative movement (rotational movement) of the rotor 3 to the vibration element.

As the effect of the above embodiment, the noise as conventionally generated by the unnecessary vibration can be decreased to a great extent during the operation of a vibration wave driven motor.

In the above embodiment, unintentional rotation of the elastic member 1 is prevented by a stopper 20.

The first embodiment described above is featured by the use of a plural number of washers 23 for discontinuously coupling the coupling plate 22 to the output transmission member 25.

Figure 6:
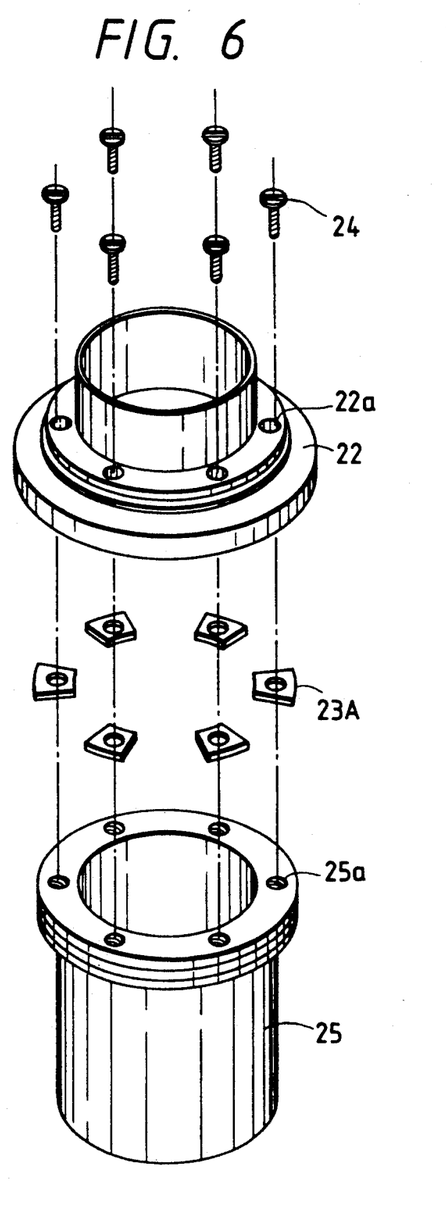
FIG. 6 is an exploded perspective view of the essential part of a photographing lens system of a single-lens reflex camera showing a second embodiment of the invention.

FIG. 6 shows a second embodiment of the present invention. In the second embodiment, a plural number of discrete sector-shaped spacers 23A are used in stead of the washers in the first embodiment.

Figure 7:
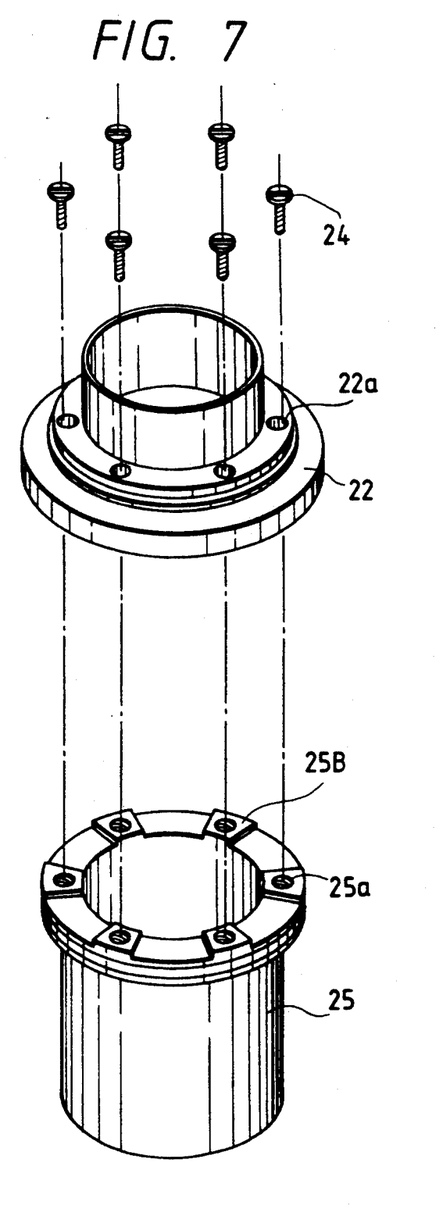
FIG. 7 is an exploded perspective view of the essential part of a photographing lens system of a single-lens reflex camera showing a third embodiment of the invention.

As a modification of the second embodiment shown in FIG. 6, the sector-shaped spacers 23A and the coupling plate 22 may be united together as an integral member. Similarly, as shown in FIG. 7, the sector-shaped-spacers and the output transmission member may be united together to form an output transmission member 25 with a plural number of sector-shaped projections 25B integrally formed on the end of the member. These embodiments have essentially the same effect as the first embodiment shown in FIG. 1.

Figure 8:
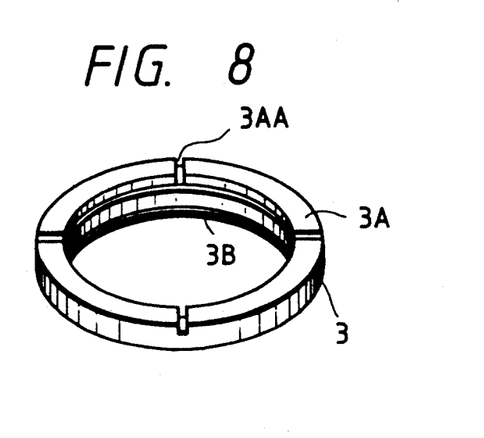
FIG. 8 is a perspective view of the rotor of a photographing lens system of a single-lens reflex camera showing a fourth embodiment of the invention.
Figure 9:
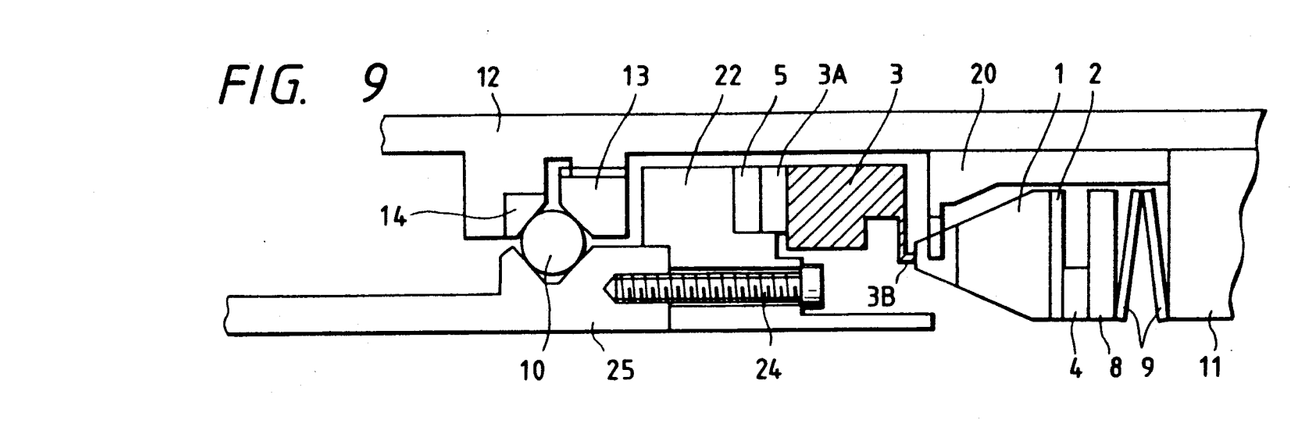
FIG. 9 is a longitudinal sectional view of the essential part of a photographing lens system in which the rotor shown in FIG. 8 has been incorporated.

FIGS. 8 and 9 shows a fourth embodiment of the present invention.

In this embodiment, there is used a rotor 3 having discrete cutouts 3AA formed on both of the end surfaces 3A and 3B as seen in FIG. 8. The rotor 3 is, as seen in FIG. 9, sandwiched in between the elastic member 1 and the vibration absorber 5 so that the driving surface of the elastic member 1 is kept in pressure-contact with the cutout end surface 3B of the rotor 3. In this embodiment, therefore, the rotor and the cutouts formed thereon constitute a discontinuous coupling member which has essentially the same effect as the above embodiments. The purpose of hatching in FIG. 9 is to clearly show the boundary between the cutout portion 3AA and the continuous portion of the rotor.

Figure 10:
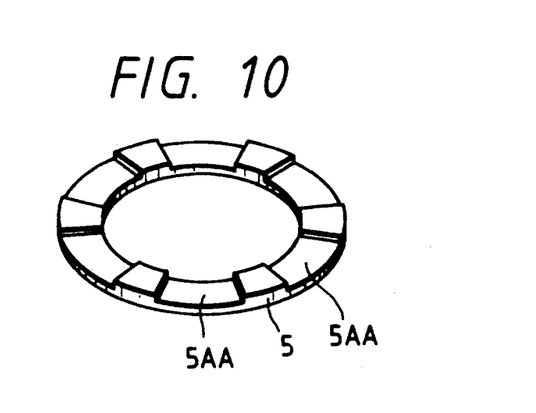
FIG. 10 is a perspective view of the vibration absorber of a photographing lens system of a single-lens reflex camera showing a fifth embodiment of the invention.
Figure 11:
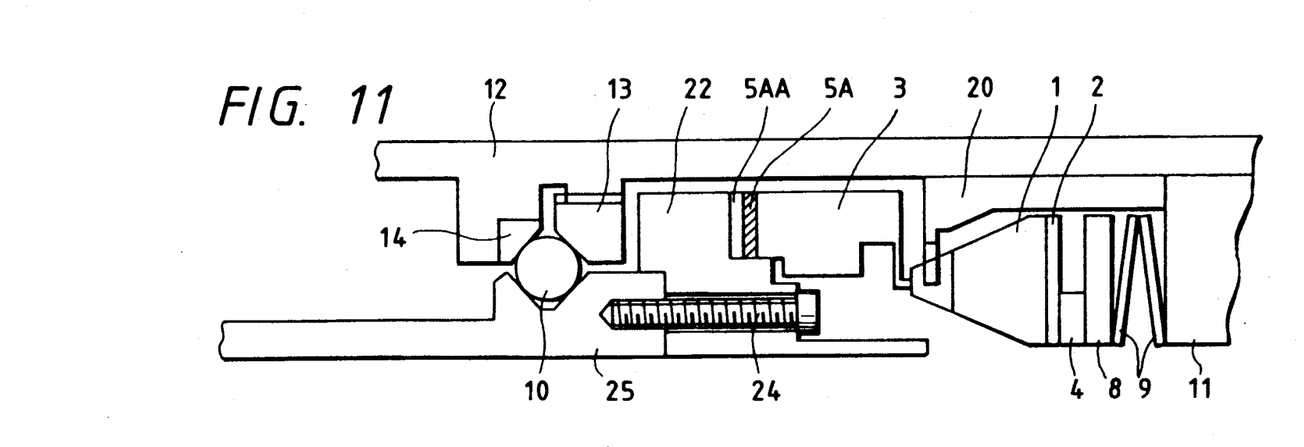
FIG. 11 is a longitudinal sectional view of the essential part of a photographing lens system in which the vibration absorber shown in FIG. 8 has been incorporated.

FIGS. 10 and 11 show a further embodiment similar to the above. In this embodiment, there is used a vibration absorber 5 having a plural number of cutouts 5AA formed thereon as shown in FIG. 10 or a vibration absorber composed of plural discrete sectors. This vibration absorber 5 is sandwiched in between the rotor 3 and the coupling plate 22 as shown in FIG. 11 to form a discontinuous coupling member which has essentially the same effect as the embodiments previously shown. In FIG. 11, again, a portion 5A of the vibration absorber 5 is hatched to cleary show the boundary between the cutout portion 5AA (FIG. 10) and the continuous portion of the rotor.

In FIGS. 6 to 11, like reference numerals to FIG. 1 represent the same or corresponding members and elements, and they need not be further described.

Figure 12:
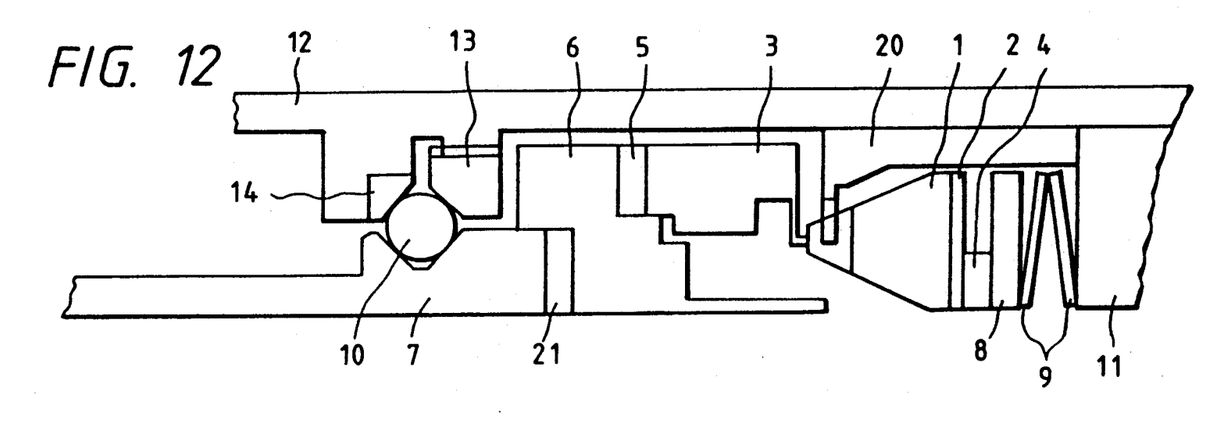
FIG. 12 is a longitudinal sectional view of the essential part of a photographing lens system of a single-lens reflex camera in which a vibration wave driven motor according to the present invention has been used.

FIG. 12 is an enlarged view of the essential part of another embodiment of a photographing lens system in which the present invention has been applied. For the sake of easy understanding, the same reference characters as in the previous embodiments are used to represent functionally the same or corresponding members and elements and no further description thereof will be made hereinafter.

Figure 13:
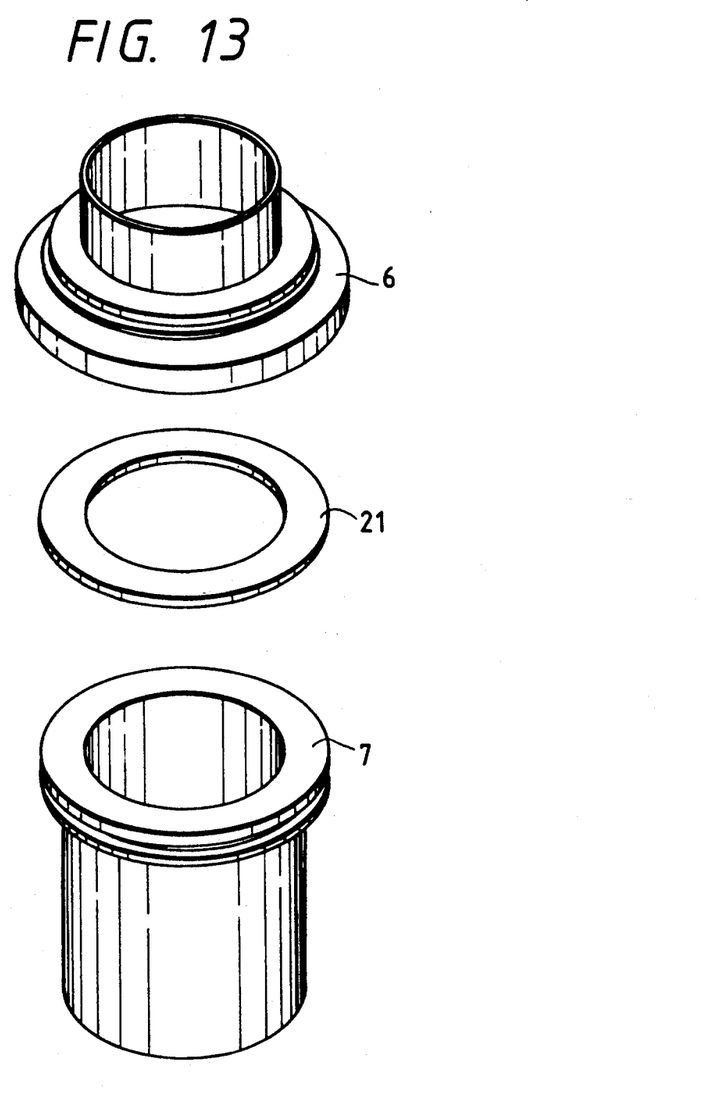
FIG. 13 is an exploded perspective view of the essential part of the photographing lens system in FIG. 12.

In this embodiment, as seen best in FIG. 13, a second vibration absorber 21 is interposed between the coupling plate 6 and the output transmission member 7. The second vibration absorber 21 may be formed of, for example, rubber such as butyl rubber. The unnecessary vibration reflected through the output transmission member 7 is absorbed by the second vibration absorber 21 to a great extent. In fact, the result of our experiments demonstrated that a butyl rubber second vibration absorber 21 can damp the amplitude of the unnecessary vibration at the forward end of the output transmission member 7 to an extent of ½ to ⅓ of that in the prior art apparatus, and that the generation of noise can be reduced substantially to zero. Since rubber such as butyl rubber is generally able to establish an intimate contact with the coupling plate 6 and the output transmission member 7, there is almost no possibility of slippage of the second vibration absorber 21 between the coupling plate 6 and the output transmission member 7. If man is afraid of such slippage, the second vibration absorber 21 may be fixed by means of bonding agent or pin (not shown).

As previously described in connection with FIG. 3, the focusing lens 27 as a load is driven by the output transmission member 7 through a connection roller 15 and a movable ring 17. Generally, a vibration absorber formed of rubber or the like has a vibration damping effect owing to an internal damping by its shearing strain. Therefore, the magnitude of the damping effect attainable by such a vibration absorber depends upon the magnitude of strain given to the absorber. In the present embodiment of the invention, the coupling plate 6 is supported by the first and second vibration absorbers 5 and 21. In this case, the coupling plate 6 per se is vibrated heavily by the unnecessary vibration. But, since the phase of the unnecessary vibration on the rotor 3 and the output transmission member 7 is different from the phase of the vibration of the coupling plate 6, the first and second vibration absorbers 5 and 21 deform heavily, which increases the internal strain greatly. As the result of it, a higher damping effect can be attained by the present embodiment.

Figure 14:
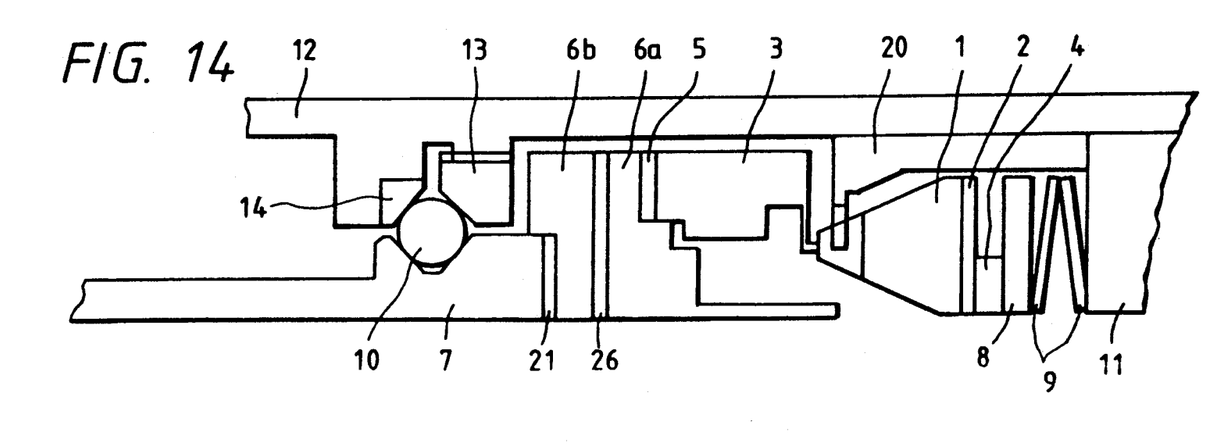
FIG. 14 is a longitudinal sectional view of the essential part of a photographing lens system of a single-lens reflex camera showing a further embodiment of the present invention.

FIG. 14 is an enlarged view of the essential part of a single-lens reflex camera showing a further embodiment of the present invention. Again, for the sake of easy understanding, the same reference characters as in the previous embodiments are used to represent functionally the same or corresponding members and elements and no further description thereof will be made hereinafter.

In this embodiment shown in FIG. 14, a third vibration absorber 26 is interposed between the first and second coupling plates 6a and 6b. The third vibration absorber 26 may be formed of rubber or the like. In the structure of this embodiment, the first coupling plate 6a is supported by the first and third vibration absorbers 5 and 26. The second coupling plate 6b is supported by the second and third vibration absorber 21 and 26. Therefore, for the reason described above, on the first and second coupling plates 6a and 6b, there is produced a large vibration whose phase is different from that of the vibration on the rotor 3 and the output transmission member 7. The first, second and third vibration absorbers 5, 21 and 26 are deformed heavily by it, which increases the internal strain greatly. As the result of it, the effect for damping the unnecessary vibration can be increased up to a great extent.

As readily understood from the foregoings, the present invention enables to remarkably reduce the noise generated by a vibration wave driven motor and to minimize the lowering of the output in a simple manner by interposing a discontinuous coupling member such as discrete washers for blocking the travelling wave of the unnecessary vibration between a vibration element and a load to be moved by a movable member.

We claim:

1. A vibration wave motor, comprising:
   a vibration member having a driving portion with a driving surface, said vibration member for generating a travelling vibration wave therein in response to an applied electrical signal;
   a contact member having a contact portion arranged in contact with the entire driving surface of said driving portion, whereby the contact member and the vibration member are relatively driven by the travelling vibration wave;
   a member for transmitting a driving force from the contact member to a load; and
   a coupling member comprising plural coupling portions, said coupling member being disposed between said contact member and said member for transmitting driving force, wherein said coupling member couples said contact member and said driving force transmitting member at plural coupling portions, and prevents propagation of a vibration wave in a direction perpendicular to said travelling vibration wave.

2. A vibration wave motor, comprising:
   a vibration member having a driving portion with a driving surface, said vibration member for generating a travelling vibration wave therein in response to an applied electrical signal;
   a contact member having a contact portion arranged in contact with the entire driving surface of said driving portion, whereby the contact member and the vibration member are relatively driven by the travelling vibration wave;
   a member for transmitting a driving force from the contact member to a load; and
   a coupling member formed in a discontinuous shape, said coupling member being disposed between said contact member and said member for transmitting driving force, said coupling member being capable of preventing propagation of a vibration wave in a direction perpendicular to said travelling vibration wave, wherein said coupling member includes a plurality of washers.

3. A vibration wave motor, comprising:
   a vibration member having a driving portion with a driving surface, said vibration member for generating a travelling vibration wave therein in response to an applied electrical signal;
   a contact member having a contact portion arranged in contact with the entire driving surface of said driving portion, whereby the contact member and the vibration member are relatively driven by the travelling vibration wave;

a member for transmitting a driving force from the contact member to a load; and a coupling member formed in a discontinuous shape, said coupling member being disposed between said contact member and said member for transmitting driving force, said coupling member being capable of preventing propagation of a vibration wave in a direction perpendicular to said travelling vibration wave, wherein said coupling member includes a sector-shaped spacer.

4. A vibration wave driven system, comprising:

a vibration member having a driving portion with a driving surface, said vibration member for generating a travelling wave thereon in response to an applied electrical signal;

a rotating member having a contact portion arranged in friction contact with the entire driving surface of said vibration member so as to be rotated by said travelling wave, said rotating member being capable of transmitting a vibration wave generated with said travelling wave in a direction toward a load;

a member for transmitting a driving force from the rotating member to the load; and a mechanical coupling member comprising plural coupling portions inserted between said rotating member and said member for transmitting driving force, wherein said mechanical coupling member couples said rotating member and said driving force transmitting member at plural coupling portions, so as to prevent the propagation of said vibration wave.

5. A vibration wave driven actuator according to claim 4, wherein said load means includes a lens element functionally coupled to the rotating member.

6. A vibration wave motor for driving a camera lens, comprising:

a vibration member having a driving portion with a driving surface, said vibration member for generating a travelling vibration wave therein in response to an applied electrical signal;

a ring-shaped rotor having a contact portion arranged in friction contact with the entire driving surface of said driving portion, the rotor being rotated by the travelling vibration wave;

a member for transmitting a driving force from the rotor to the camera lens;

an absorption member disposed between said rotor and said member for transmitting driving force and for absorbing vibration perpendicular to the propagation direction of said travelling vibration wave; and a coupling member comprising plural coupling portions, said coupling member being disposed between said rotor and said member for transmitting driving force, wherein said coupling member couples said rotor and said driving force transmitting member at plural coupling portions, for preventing said vibration from being transmitted to said member for transmitting driving force.

7. A vibration wave motor, comprising:

a vibration member having a driving portion with a driving surface, said vibration member for generating a vibration wave therein in response to an applied electrical signal;

a contact member having a contact portion arranged in friction contact with the driving surface of said driving portion, whereby the contact member and the vibration member are relatively driven by the vibration wave;

a member for transmitting a driving force from the contact member to a load; and a coupling member comprising plural coupling portions, said coupling member being disposed between said contact member and said member for transmitting driving force, wherein said coupling member couples said contact member and said driving force transmitting member at plural portions, and prevents propagation of vibration that is substantially perpendicular to the vibration wave.

* * * * *

UNITED STATES PATENT AND TRADEMARK OFFICE
CERTIFICATE OF CORRECTION

PATENT NO. : 5,189,331

DATED : February 23, 1993

INVENTOR(S) : MUKOHJIMA ET AL.

Page 1 of 2

It is certified that error appears in the above-identified patent and that said Letters Patent is hereby corrected as shown below:

COLUMN 1

Line 20, "and-" should read --and--.
    Line 42, "round" should read --around--.
    Line 49, "numeral-" should read --numeral--.
    Line 61, "holds 22a" should read --holes 22a--.

COLUMN 3

Line 40, "coupled" should read --coupled to--.
    Line 57, "As" should read --At--; and "are" should read --is--.
    Line 59, "can be left remained" should read --remains--.

COLUMN 4

Line 6, "not-" should read --not--.
    Line 28, "in stead" should read --instead--.
    Line 40, "shows" should read --show--.
    Line 66, "cleary" should read --clearly--.

COLUMN 5

Line 30, delete "man is".
    Line 31, delete "afraid of"; and after "slippage" insert --is feared--.

UNITED STATES PATENT AND TRADEMARK OFFICE
CERTIFICATE OF CORRECTION

PATENT NO. : 5,189,331

DATED : February 23, 1993

INVENTOR(S) : MUKOHJIMA ET AL.

It is certified that error appears in the above-identified patent and that said Letters Patent is hereby corrected as shown below:

COLUMN 7

Line 36, "actuator" should read --system--.
Line 37, "said" should read --the--; and "means" should be deleted.

Signed and Sealed this

First Day of February, 1994

Attest:

BRUCE LEHMAN

Attesting Officer

Commissioner of Patents and Trademarks